US008812285B2

(12) United States Patent
Irturk et al.

(10) Patent No.: US 8,812,285 B2
(45) Date of Patent: Aug. 19, 2014

(54) DESIGNING DIGITAL PROCESSORS USING A FLEXIBILITY METRIC

(75) Inventors: Ali Umut Irturk, San Diego, CA (US); Ryan Charles Kastner, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 232 days.

(21) Appl. No.: 13/223,269

(22) Filed: Aug. 31, 2011

(65) Prior Publication Data

US 2012/0065956 A1 Mar. 15, 2012

Related U.S. Application Data

(60) Provisional application No. 61/378,903, filed on Aug. 31, 2010.

(51) Int. Cl.
*G06F 17/50* (2006.01)
(52) U.S. Cl.
CPC ........ *G06F 17/5045* (2013.01); *G06F 2217/68* (2013.01)
USPC .......................................................... 703/14
(58) Field of Classification Search
None
See application file for complete search history.

(56) References Cited

U.S. PATENT DOCUMENTS

| | | | | |
|---|---|---|---|---|
| 6,178,542 | B1 * | 1/2001 | Dave ............................... | 703/14 |
| 7,337,100 | B1 * | 2/2008 | Hutton et al. .................. | 703/14 |
| 8,006,204 | B2 * | 8/2011 | Killian et al. ................. | 716/100 |
| 2008/0244471 | A1 * | 10/2008 | Killian et al. ................... | 716/1 |

OTHER PUBLICATIONS

Mesa-Martinez, Francisco; Renau, Jose "Effective Optimistic-Checker Tandem Core Design Through Architectural Pruning" IEEE ACM Int'l Symp. on Microarchitecture (2007) available from <http://ieeexplore.com.org/xpls/abs_all.jsp?arnumber=4408259>.*
Mukherjee, S., et al. "Measuring Architectural Vulnerability Factors" IEEE Micro., vol. 23, issue 6, pp. 70-75 (2003) available from <http://ieeexplore.ieee.org/xpls/abs_all.jsp?arnumber=1261389>.*
Irturk, A. "GUSTO: An Automatic Generation and Optimization Tool for Matrix Inversion Architectures," ACM Transactions on Embedded Computing Systems, 9(4):1-21, Mar. 2010.
Irturk, A. "GUSTO: General Architecture Design Utility and Synthesis Tool for Optimization," Ph.D. dissertation, University of California, San Diego, 272 pages, (2009).
Irturk, A., et al., "Simulate and Eliminate: A Top-to-Bottom Design Methodology for Automatic Generation of Application Specific Architectures," IEEE Transactions on Computer-Aided Design of Integrated Circuits and Systems, 30(8):1173-1183, Aug. 2011.

* cited by examiner

*Primary Examiner* — Kamini S Shah
*Assistant Examiner* — Jay B Hann
(74) *Attorney, Agent, or Firm* — Perkins Coie LLP

(57) ABSTRACT

Techniques, structures, and systems are disclosed for implementing an efficient design of computer hardware using a top-to-bottom approach. In one aspect, a method for designing a processor includes generating an initial architecture for a processor to execute algorithms, simulating execution of the algorithms by the initial architecture to determine a modification to the initial architecture, and creating a processor design based on the modification to the initial architecture. The described method for implementing a hardware design tool provides a push-button transition from high level specification for algorithms to hardware description language.

20 Claims, 12 Drawing Sheets

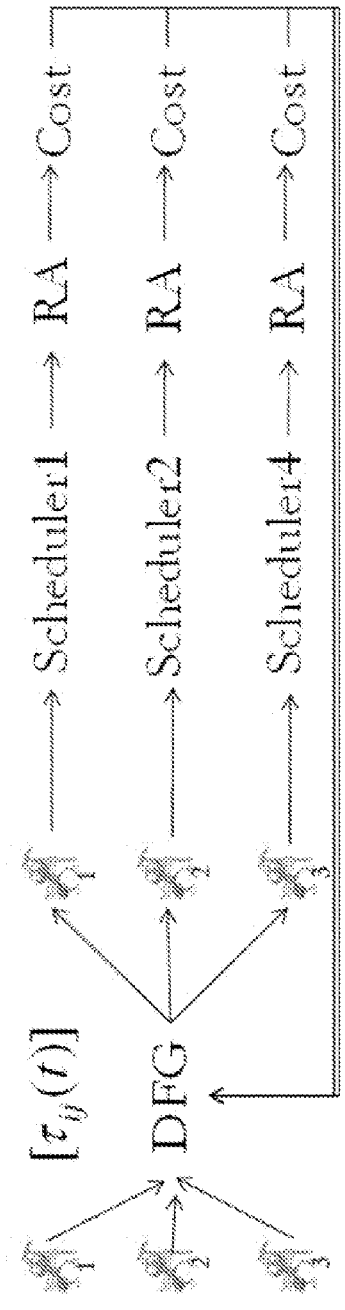
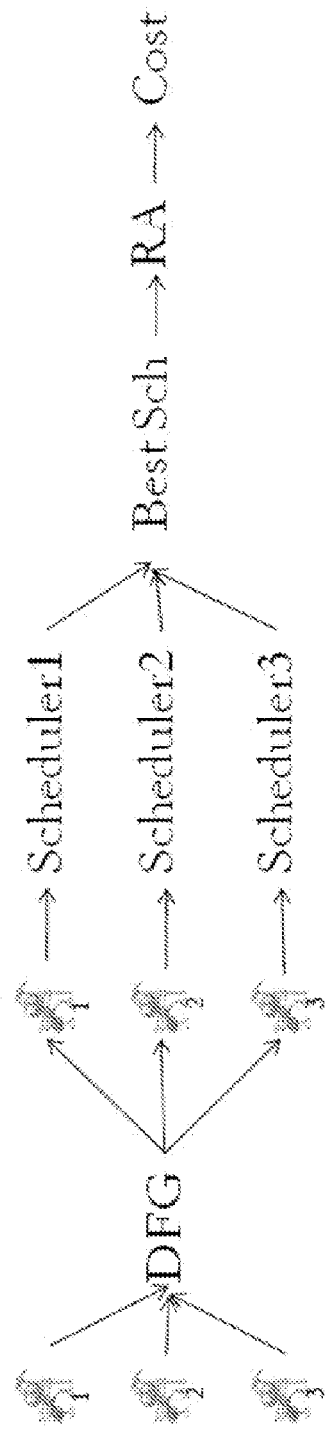
FIG. 7

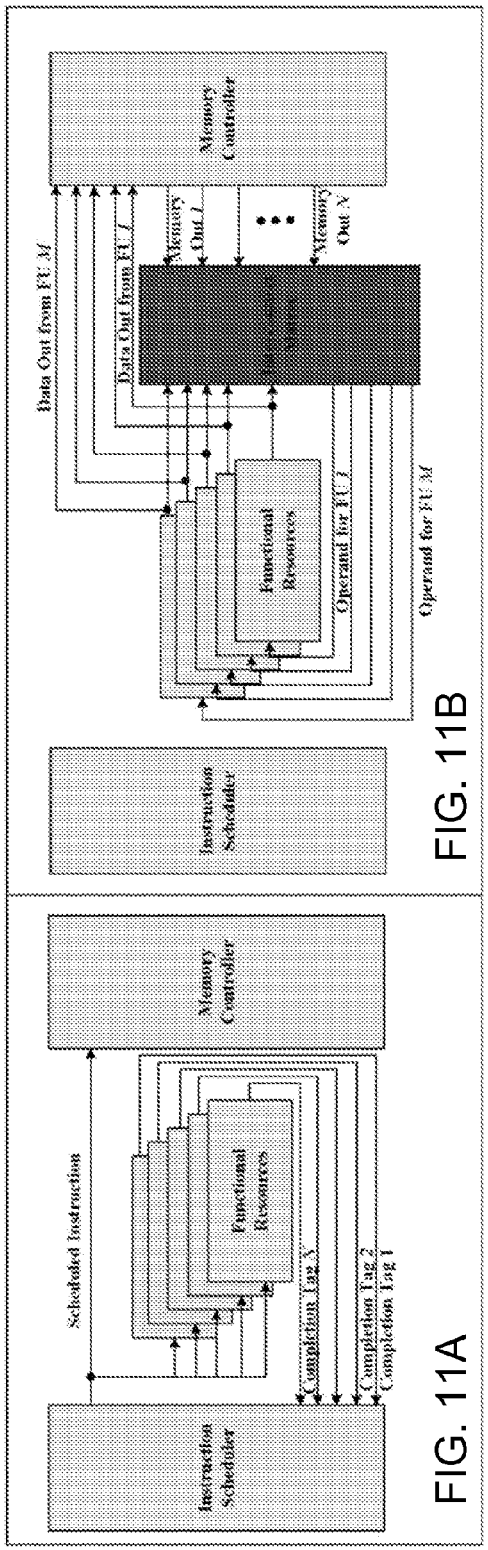
FIG. 11A
FIG. 11B
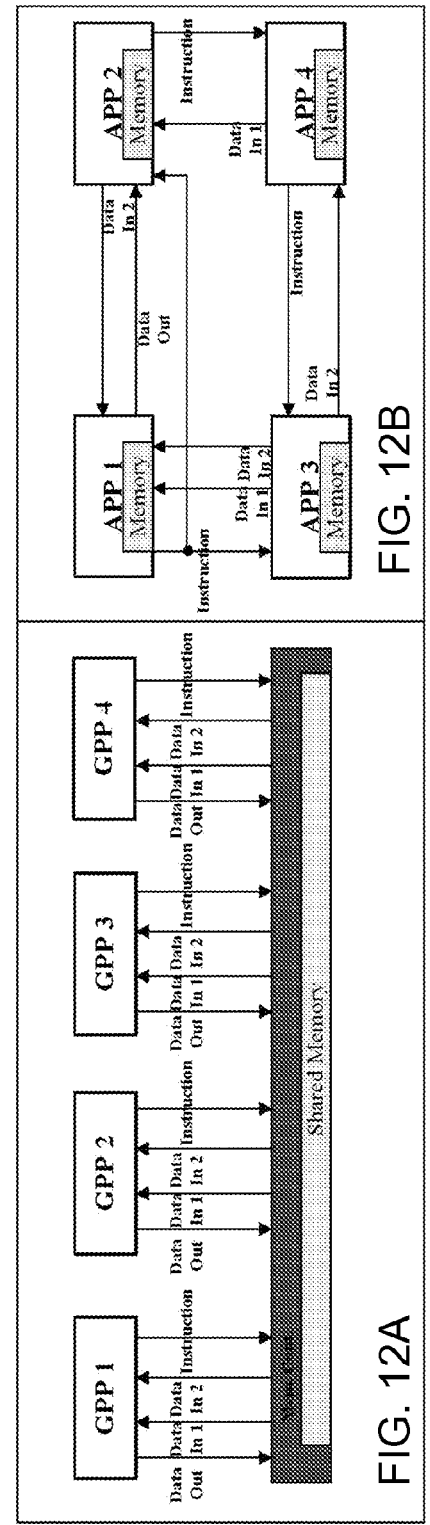
FIG. 12A
FIG. 12B

DESIGNING DIGITAL PROCESSORS USING A FLEXIBILITY METRIC

CROSS-REFERENCE TO RELATED APPLICATIONS

This application claims benefit of prior U.S. Provisional Patent Application No. 61/378,903, filed Aug. 31, 2010. The entire content of the before-mentioned patent application is incorporated by reference as part of the disclosure of this application.

BACKGROUND

This patent document relates to digital hardware designs.

Computational power of integrated circuits has increased dramatically over the past several decades due to improvements in integrated circuit designs and fabrication techniques, including shrinking transistor size and the corresponding increase in transistor count. In the past years, the frequency of a single processing core has slowed dramatically as power dissipation and the resulting heat generation has limited processor speed.

There has been great interest in increasing in processing power using parallel processing cores, which can provide more processing power per watt than can be achieved with a single processor solution. Yet, another prevalent trend in computing to increase processing power includes the specialization of processors. Early examples of specialized processors can include digital signal processors (DSPs), which has since proliferated to application domains including networking, wireless communication, audio and vision. These processors can typically be developed for embedded computing systems, which can have stringent constraints on performance. Achieving the desired requirements therefore can demand careful tuning of the underlying architecture that requires substantial amounts of time.

SUMMARY

Techniques, systems, and apparatuses are disclosed for implementing an efficient design of computer hardware.

In one aspect of the disclosed technology, a method for designing a processor includes generating an initial architecture for a processor to execute an algorithm or multiple algorithms, in which the initial architecture includes processing element(s), memory element(s), and information transfer mechanism(s); simulating execution of the algorithm(s) by the initial architecture to determine a modification to the initial architecture; and creating a processor design based on the modification to the initial architecture.

Various implementations of the above aspect can include one or more of the following features. The method can include determining a usage pattern of the processing element(s), memory element(s), and information transfer mechanism(s). The method can include accepting a high level program code and transforming the high level program code into a low level code. The method can include collecting functional information of the processing element(s), memory element(s), and information transfer mechanism(s) and producing a hardware resource usage report. The functional information can include utilization characteristics of the processing element(s), memory element(s), and information transfer mechanism(s). The method can include selectively eliminating under-utilized processing element(s), under-utilized memory element(s) and under-utilized information transfer mechanism(s) according to the hardware resource usage report. The method can further include verifying the processor design. The method can further include producing a hardware description language of the processor design. The method can further include determining a flexibility metric for the processing element(s), memory element(s), and information transfer mechanism(s). The processor design can include an application-specific architecture that can be smaller in area, higher in throughput, and/or consume lower power than the initial architecture. The initial architecture can be fully programmable.

In another aspect, an apparatus for designing a processor includes a module for generating an initial architecture for a processor to execute an algorithm or multiple algorithms, in which the initial architecture includes processing element(s), memory element(s), and information transfer mechanism(s); a module for determining computational resources for execution of the algorithm(s) on the initial architecture; and a module for creating a processor design based on the computational resources and the initial architecture.

Various implementations of the above aspect can include one or more of the following features. The apparatus can include a module for iteratively determining a usage pattern of the processing element(s), memory element(s), and information transfer mechanism(s). The apparatus can include a module for accepting a high level program code and transforming the high level program code into a low level code. The apparatus can include a module for collecting functional information of the processing element(s), memory element(s), and information transfer mechanism(s) and producing a hardware resource usage report. The functional information can include utilization characteristics of the processing element(s), memory element(s), and information transfer mechanism(s). The apparatus can include a module for selectively eliminating under-utilized processing element(s), under-utilized memory element(s) and under-utilized information transfer mechanism(s) according to the hardware resource usage report. The apparatus can include a module for verifying the processor design. The apparatus can include a module for producing a hardware description language of the processor design. The apparatus can include a module for determining a flexibility metric for the processing element(s), memory element(s), and information transfer mechanism(s).

In another aspect, a computer program product that includes a nonvolatile computer-readable storage medium having instructions stored thereon, includes code for generating an initial architecture for a processor to execute an algorithm or multiple algorithms, in which the initial architecture includes processing element(s), memory element(s), and information transfer mechanism(s); code for simulating execution of the algorithm(s) by the initial architecture to determine a modification to the initial architecture; and code for creating a processor design based on the modification to the initial architecture.

Various implementations of the above aspect can include one or more of the following features. The nonvolatile computer-readable storage can include code for iteratively determining a usage pattern of the processing element(s), memory element(s) and information transfer mechanism(s). The nonvolatile computer-readable storage can include code for accepting a high level program code and transforming the high level program code into a low level code. The nonvolatile computer-readable storage can include code for collecting functional information of the processing element(s), memory element(s) and information transfer mechanism(s) and producing a hardware resource usage report. The functional information can include utilization characteristics of the processing element(s), memory element(s) and information transfer mechanism(s). The nonvolatile computer-readable storage can include code for selectively eliminating under-utilized processing element(s), under-utilized memory element(s) and under-utilized information transfer mechanism(s) according to the hardware resource usage report.

The subject matter described in this patent document potentially can provide one or more of the following advantages and be used in many applications. The top-to-bottom design methodology can provide simplicity (through the use of a simple tool chain and programming model); flexibility (through the use of different languages, e.g., C/MATLAB, as a high level specification and different parameterization options); scalability (through the ability to handle complex algorithms); and performance (through the use of trimming optimization using a simulate & eliminate method). For example, the disclosed technology can provide a processor design tool that can provide fast and highly efficient hardware production capable of executing any algorithm or application. The disclosed technology can provide the ability to prototype hardware systems in just minutes instead of days or weeks with these capabilities. For example, an already fully proven chip, such as a computer microprocessor, can be optimized that allow a user to start with full functionality and then strip away the unneeded parts for a particular application, thereby reducing area and power consumption. In an exemplary worst case scenario, the existing microprocessor can be used as is, which is capable of running any program. In an exemplary best case scenario, many un-needed functions of the microprocessor can be stripped away, yielding a minimized final design that can work as intended with minimal original engineering required. This efficient design technology can create new working designs of an existing computer chip, which can be brought to market faster and cheaper using proven technology with broad manufacturability.

BRIEF DESCRIPTION OF THE DRAWINGS

FIG. 7 shows an exemplary instruction scheduling and register allocation with ACO using two different feedback approaches.

FIGS. 11A and 11B show an example of a single core design for a RISC type general-purpose processor architecture.

FIG. 12A shows an exemplary initial, general-purpose multi-core architecture.

FIG. 12B shows a final application-specific multi-core architecture.

DETAILED DESCRIPTION

Techniques, systems, and apparatuses are described for implementing an efficient design of computer hardware.

In one embodiment of the disclosed technology, a hardware design utility and synthesis tool for optimization of a processor using a top-to-bottom approach is described that can provide a push-button transition from a high level specification (e.g., matrix computation algorithms written as a C, C++ or MATLAB program) to hardware description language (HDL). The hardware design utility and synthesis tool for optimization of a processor is also referred to as a hardware design tool. The disclosed hardware design tool can have a plurality of modular functionalities. For example, the hardware design tool can include a design space exploration tool, a simulation and elimination tool, and an HDL generation tool.

In one aspect, an exemplary hardware design tool can perform design space exploration on different architectures for a given (set of) application(s) to provide a basis for hardware implementation, which can produce cycle accurate results as well as estimates of area, throughput, and other performance metrics. Design space exploration can guide the initial generation of a processor by scheduling an initial architecture based upon the given (set of) application(s). After performing the design space exploration, the exemplary hardware design tool can run the application(s), determine the unnecessary components and remove them. Also, HDL register-transfer level (RTL) code can be generated to create an optimized processor architecture for that particular (set of) application(s).

The exemplary hardware design tool can automatically generate application-specific single-core and multi-core architectures for a (set of) given application(s). The selective removal of unnecessary functionalities of the architecture components, referred to as trimming and optimization, can be performed by the exemplary hardware design tool in a process that can also be referred to as simulate and eliminate (S&E). For example, a top-to-bottom hardware design approach that includes an exemplary S&E process can first generate a general-purpose multi-core architecture; the provided applications can be simulated on this architecture and the unneeded functionality (e.g., interconnect, functional resources, control and memory) can be eliminated resulting in an application-specific multi-core architecture. By implementing the S&E process, a multi-core architecture can optimized into one in which all the processing cores are utilized; therefore all the processing cores that are not used can be removed from the final architecture. For example, the processor can be generated to include only the required resources internally; the interconnect, functional units, controllers, and memory elements that are not used can be removed from the final architecture. Thus, each core may have a different memory structure, interconnect, controllers, or functional units.

Figure 1A:
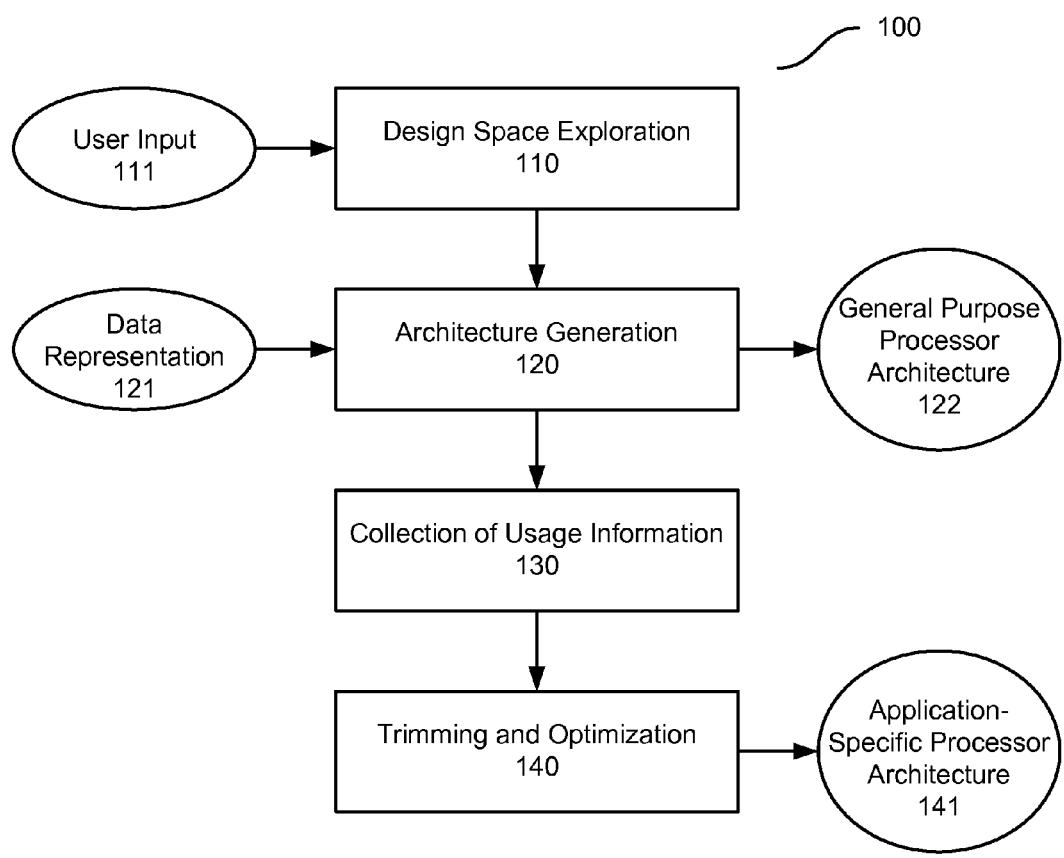
FIG. 1A shows a block diagram of an exemplary processor design process using a top-to-bottom approach.

FIG. 1A shows a block diagram of an exemplary processor design process 100 using the top-to-bottom hardware design tool by implementing design space exploration process 110, architecture generation process 120, collection of usage information process 130, and trimming and optimization process 140. The design space exploration process 110 can utilize a user input 111 to determine the architecture comprising processing elements (PEs), memory elements, and their corresponding data paths, which can be optimized and specified to the inputted application. User input 111 can include process parameters, e.g., programs, algorithms and parameters specified by a user, e.g., high level specification algorithm(s) and program(s) (e.g., in C, C++, or MATLAB code), algorithmic parameters (e.g., description of inputs), the type and number of processing elements, data representation 121 (e.g., the integer and fractional bit width), and the mode of operation.

The architecture generation process 120 can create any general purpose processor architecture 122 as a starting point (e.g., RISC, VLIW, superscalar). The architecture generation process 120 can utilize user input such as data representation 121, which can include the integer and fractional bit width. The general purpose processor can be exploited in the collection of usage information process 130 to information including the scheduling and binding information from instruction and memory controllers that can be used to eliminate dynamic scheduling and create a static and scheduled architecture automatically. An optimized, application-specific processor architecture 141 can be created in trimming and optimization process 140 that performs resource trimming, pares away unused resources, and eliminates under-utilized functionality while ensuring the correctness of the solution is maintained. This process includes simulating the architecture to define the usage of arithmetic units, multiplexers, register entries and input/output ports, etc., and resources and components determined to be under-utilized can be trimmed away with their interconnects.

Figure 1B:
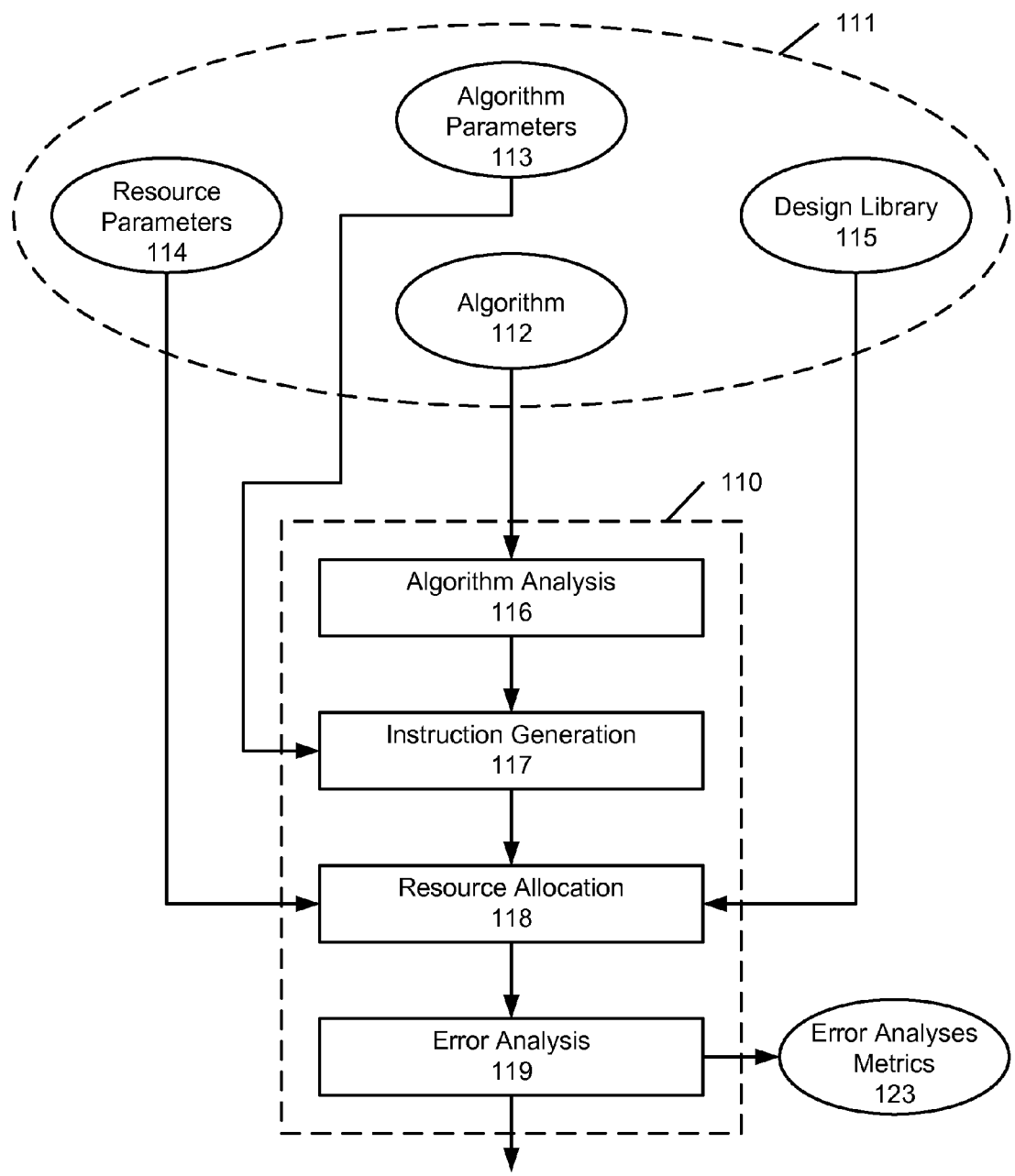
FIG. 1B shows an exemplary design space exploration process.

FIG. 1B shows an exemplary design space exploration process 110 when the user input 111 includes an algorithm, e.g. a matrix computation algorithm, to gain an understanding of area, throughput, and other performance metrics of the algorithm on the initial hardware design. An algorithm 112 received from a user can be analyzed by the algorithm analysis process 116 to determine a usage pattern of the initial architecture. The design space exploration process 110 can allow the user to input other algorithmic parameters 113 (if any is warranted) in instruction generation process 117 and select the type and number of arithmetic resources (e.g., resource parameters 114 and/or design library 115, if any is warranted) in resource allocation process 118. Error analysis process 119 can be implemented after the resource allocation step 118 to provide error analysis metrics 123.

There are two different types of approximations for real numbers: fixed-point and floating-point arithmetic systems. Floating-point arithmetic can represent a large range of numbers with some constant relative accuracy. Fixed-point arithmetic can represent a reduced range of numbers with a constant absolute accuracy. However, usage of floating point arithmetic can be expensive in terms for hardware and can lead to inefficient hardware designs, e.g. for FPGA implementation. On the other hand, fixed point arithmetic can result in efficient hardware designs, but with the possibility of introducing calculation error, e.g. round-off and truncation errors. If the user desires, error analysis process 119 can be used to find an appropriate fixed point representation that provides results with the accuracy similar to that of a floating point implementation.

For example, this exemplary design exploration process 110 can take the user input data 111 and perform a matrix computation using single or double precision floating point arithmetic, which can be referred as the actual results. The same calculations can be performed using different bit widths of fixed point representations to determine the error, the difference between the actual and the computed result. Error analysis process 119 can provide error analyses metrics 123, e.g., four different metrics to the user to determine if the accuracy is enough for the application, which can include mean error, standard deviation of error, peak error, and mean percentage error.

A first metric, mean error, can be computed by finding the error for all resulting matrix entries and then dividing the sum of these errors by the total number of entries. This calculation can be seen as $$\frac{\sum_{i=1}^{m} |y_i - \hat{y}_i|}{m},$$

where y, $\hat{y}$ and m are the actual results, the computed results, and the number of entries that are used in the computation (e.g., 16 for a 4×4 matrix), respectively. Mean error can be an important metric for error analysis, however it may not include the information about outlier errors. This can be the case where a small number of entries have very high error but the majority of entries have very small error. To calculate the dispersion from the mean error, the standard deviation of error, and the peak error can be introduced. Mean error sometimes can lead to misleading conclusions if the range of the input data is small. Therefore the fourth metric, mean percentage error, can make better sense if the relative error is considered. This metric can be defined as $$\frac{\sum_{i=1}^{m} |y_i - \hat{y}_i|}{m}.$$

The architecture generation process 120 (in FIG. 1A) can utilize user input that can include data representation 121 (e.g., integer and fractional bit width) and automatically generates a general purpose processor architecture 122, capable of exploiting instruction level parallelism. The general purpose initial architecture (e.g., processing element(s), memory elements and information transfer elements or mechanisms) can be generated by a scheduling algorithm, for example by using resource constrained list scheduling after the inputs 111 are given. Simulating this architecture can reveal the assignments done to the processing elements, the memory elements and the information transfer elements during the scheduling process. Gathering this information and using it to eliminate unneeded functionality, e.g., removing portions of the processing elements, memory elements and information transfer mechanisms can result in an optimized architecture with significant area and timing savings.

Figure 2:
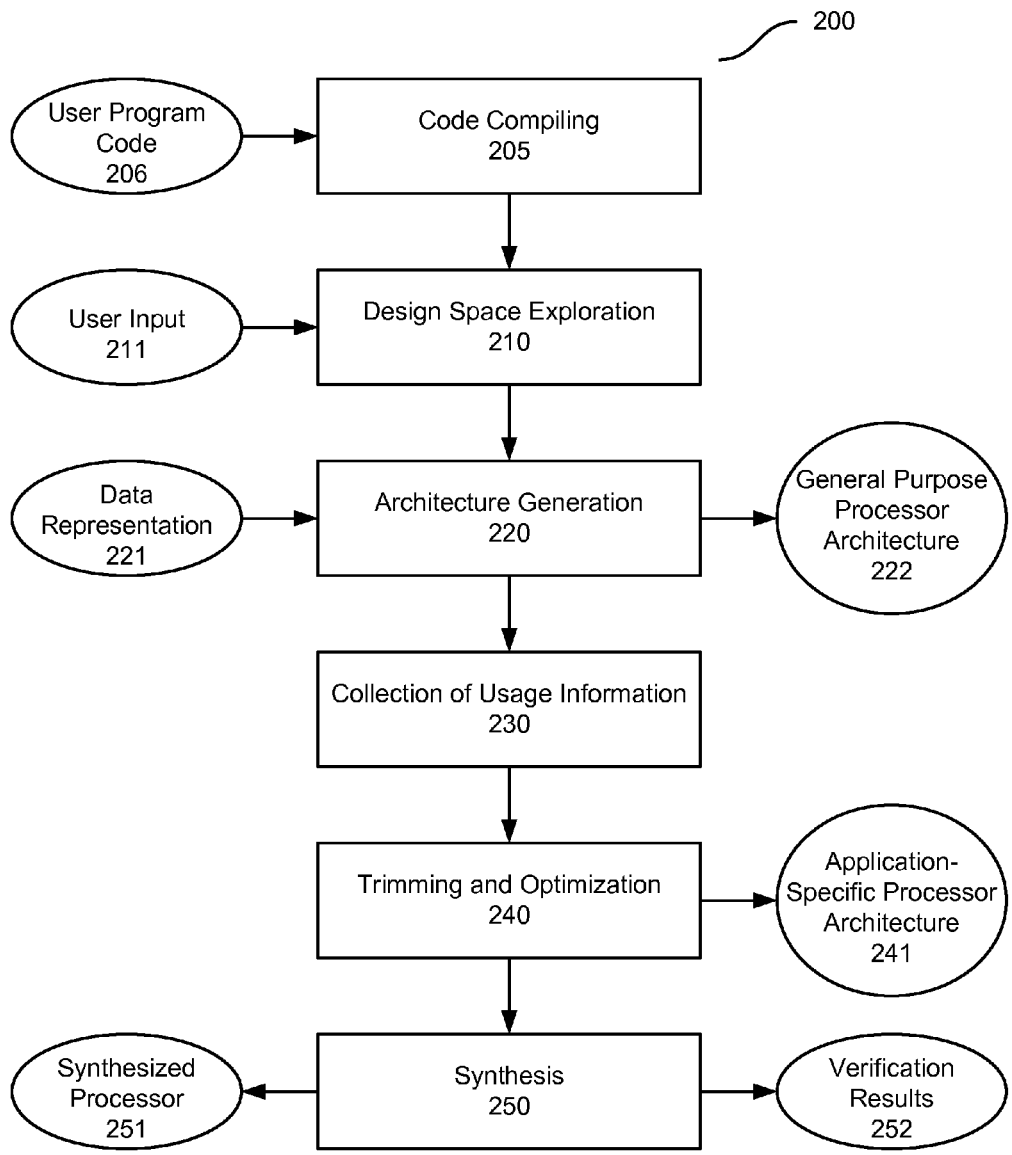
FIG. 2 shows a block diagram of another exemplary processor design process using a top-to-bottom approach.

FIG. 2 shows a block diagram of another exemplary processor design process 200 using a top-to-bottom approach. In this example, a user program code 206 can be accepted and compiled in a code compiling process 205 before implementing design space exploration process 210, architecture generation process 220, collection of usage information process 230, trimming and optimization process 240, and synthesis process 250.

In this example, a user program code 206, e.g., an application or algorithm written in C, C++, or MATLAB code, can be inputted into code compiling process 205 to generate an intermediate representation of the program code, for example low level code and/or data flow graphs. The resulted low level code and/or data flow graphs, accompanied by any user input 211, can be fed into design space exploration process 210 and architecture generation process 220 to generate an initial architecture that can provide a fully programmable, general purpose processor (initial) architecture 222. For example, design process 210 can execute the compiled code from code compiling process 205 on the initial hardware design, which can determine usage patterns and scheduling information of the initial architecture. The initial architecture can include processing elements, memory elements, and information transfer mechanisms (e.g., interconnect (I×C)). The architecture generation process 220 can utilize the exemplary usage patterns (and any additional user input that can include data representation 221 (e.g., integer and fractional bit width), if any) to generate a general purpose processor architecture 222. The general purpose processor architecture 222 can be simulated to collect usage information about its functionality (e.g., functional information) in collection of usage information process 230. The exemplary functional information can include characteristics on whether or not and how the processing elements, memory elements and information transfer mechanisms are utilized (or under-utilized). The exemplary functional information can be used to generate a hardware resource usage report in trimming and optimization process 240. The report can be used to selectively eliminate or trim the general purpose processor architecture 222 to create the application-specific processor (final) architecture 241. The report can be used in synthesis process 250 to generate a processor design (synthesized processor 251) based on the final architecture and results (verification results 252) to verify the correctness of the HDL e.g., to insure that it correctly executes the original algorithm.

An exemplary generated process design of a multi-core architecture can be rendered to only have just the required functionality between its processing elements, memory elements and information transfer mechanisms. An apparatus or system that includes disclosed hardware design tool can employ the top-to-bottom design methodology to generate correct-by-construction and cycle-accurate multi-core architectures for given application(s). In one example, the exemplary hardware design process can start from a fully-connected, fully-verified, general-purpose multi-core architecture and pare away unneeded functionality to create an application-specific multi-core architecture—the process not only removes unneeded processing elements, but also unnecessary interconnect, information transfer mechanisms (e.g., control logic) and memory elements. Implementing a design space exploration can determine usage patterns and information that can be used to determine and trim underutilized functional resources, which ultimately can create an application-specific multi-core architecture for executing a specific (set of) application(s). An apparatus or system that can implement the top-to-bottom hardware design tool (that includes S&E) can be utilized using any application described by algorithms, e.g., image processing applications: object detection, object recognition, and color classification.

Exemplary characteristics of the top-to-bottom design methodology can include scalability, reconfigurability, and ease of design and verification. Generating an architecture for a given application by using a bottom-to-top methodology fails to synthesize larger, more complex applications because of the complexity of high level synthesis tasks such as scheduling, resources allocation and binding. An apparatus or system that includes the disclosed hardware design tool can synthesize even the largest applications. For example, because of its top-to-bottom design methodology, an exemplary worst-case generated architecture could be the initial general-purpose architecture, and an exemplary best-case generated architecture could be a final architecture that includes only the required resources with the unneeded functions stripped away. Generating an architecture for a given application by using a bottom-to-top methodology eliminates the opportunity of reconfigurability. An apparatus or system that includes the disclosed hardware design tool can generate an application-specific architecture that can keep part of the general-purpose multi-core architecture, so that a user can recompile a different application on this existing architecture. This is a significant advantage since reconfigurability provides the reuse of the already existing architectures. An apparatus or system that includes the disclosed hardware design tool can provide ease of design through its simplicity in its design flow and ease of verification due to its fully-verified initial general-purpose architecture. The initial general-purpose processor architecture can utilize a well understood programming model that is capable of running any application. Using the tool, the generated initial general purpose architecture can also be fully-verified for correctness. This verification can occur before the optimizations start. Thus, removing unneeded functionality (interconnect, functional resources, control and memory), for example, does not affect the correctness of the design, providing ease of verification.

The disclosed hardware design tool can be included in a system, and an exemplary system framework is described herein. The exemplary system can take a user defined (set of) application(s), perform design space exploration across a set of processor architectures, and generate an application specific processor optimized towards these particular (set of) application(s). This top-to-bottom approach can start with a fully programmable, general purpose processor of a generated initial architecture and eliminate unneeded functionality to form a final architecture of the accelerated processor. This process may reduce some unnecessary functionality of the processor while increasing its performance. Conventional high level synthesis tools employ a "bottom-to-top" approach where they decide on the number of resources (functional units, registers, etc.), perform scheduling of the operations to these resources, and generate the interconnect and control logic that allows the provided input application to function on this data path. The exemplary top-to-bottom approach can exhibit superior performance, power consumption, flexibility and programmability.

Figure 3:
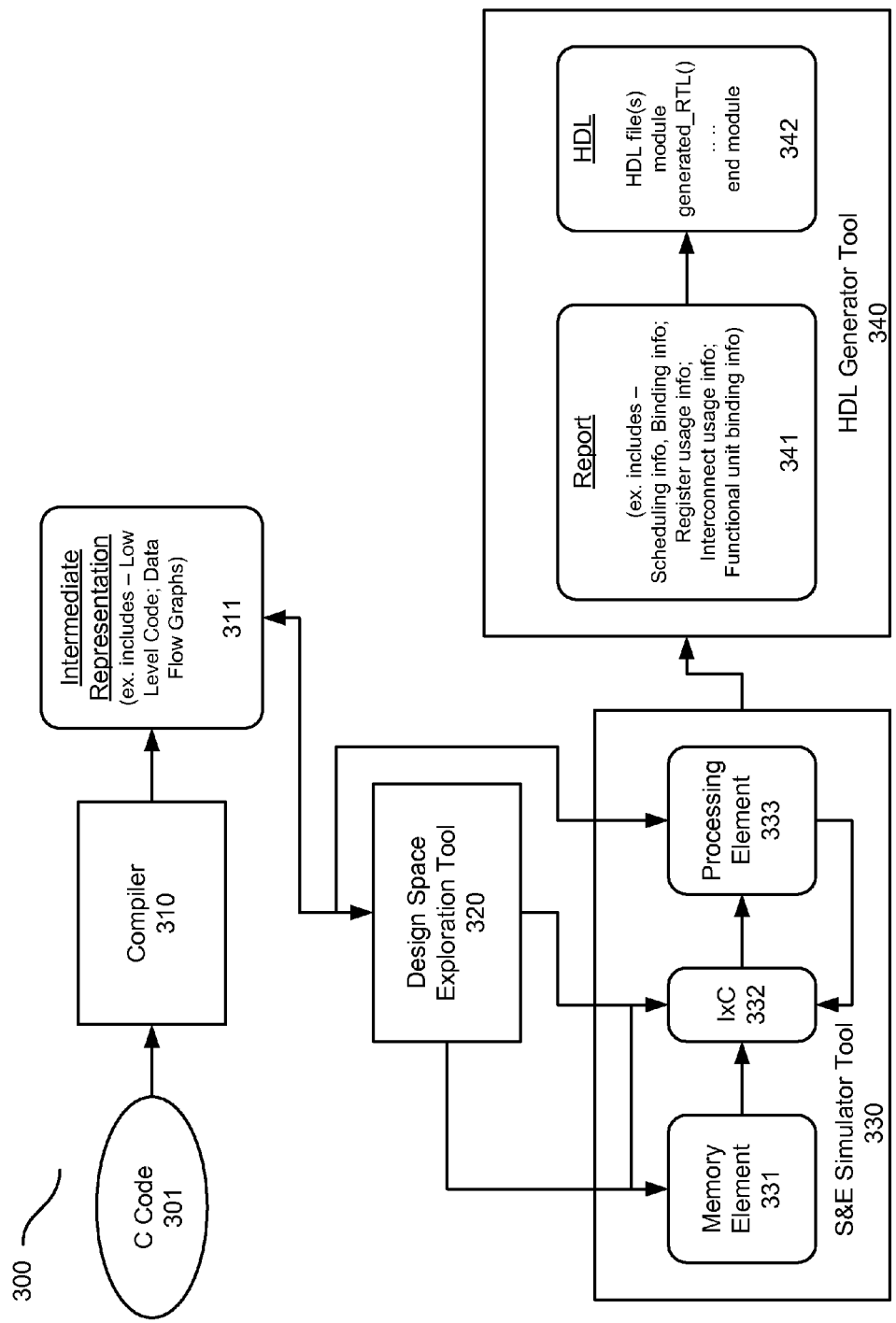
FIG. 3 shows a design flow process of an exemplary system to implement the top-to-bottom approach to design a processor.

FIG. 3 shows a design flow process of an exemplary system 300 to implement the top-to-bottom approach to design a processor. The front-end can accept user input, e.g., program code such as C code 301, and can transform it to low level code, e.g., by compiling the C code 301 using a compiler 310, such as a low level virtual machine (LLVM). The compiled program can be represented as an intermediate representation 311, e.g., low level code and data flow graphs (DFGs), that can be fed into a design space exploration tool 320 that decides the processor architecture (e.g., the best, most optimal processor architecture for the given application(s)). This can determine the class of processor (e.g., RISC, VLIW, out of order execution, superscalar) and the parameters (e.g., number of registers, read/write ports, functional units). Additionally, other user input can include parameters that can include anything that is in the library, e.g., specify to use a functional unit like a matrix inversion core and singular value decomposition core. The design space exploration tool can generate an initial architecture that can provide a specific, fully programmable processor to the S&E simulator tool 330. The initial architecture can include memory elements 331 (e.g., register file(s), cache(s)), processing elements 333 (e.g., functional units, predictors), and information transfer mechanisms 332 (e.g., the interconnect (I×C), control logic). The S&E simulator tool can execute a given application on the given processor architecture, which can collect usage information, e.g., usage patterns, data flow movement and scheduling information, on the initial architecture. In doing so, the S&E simulator can generate a hardware resource usage report 341 for the given application on the given processor architecture. A hardware usage report can include scheduling information, binding information, register usage information, interconnect usage information, and functional unit binding information. The hardware usage report 341 can be used to generate or trim the general purpose processor using the S&E simulator 330 to create a final architecture for a hardware accelerator, e.g., an augmented application-specific processor of smaller area, higher throughput, and less power consumption. The hardware usage report 341 can be used to generate or synthesize HDL using a HDL generator tool 340, which the result can include synthesizable HDL 342.

The exemplary hardware design tool can utilize a single instruction issue, out of order execution processor architecture. The parameters of the architecture, which can include the number of registers and the number and type of functional units, can be specified as input to the tool. The disclosed embodiment or other embodiments of the hardware design utility and synthesis tool for processor optimization can be implemented on other classes of architectures, e.g., RISC-based and VLIW-based architectures. In these embodiments, design space exploration can be performed to determine the set of architectural parameters that best suit the needs of the given application(s), followed by trimming/elimination of unneeded functionality. The tool can render a final architecture for an application-specific processor and output synthesizable HDL.

RISC processors can be considered simple by definition. Therefore, the design space exploration options can be limited. Two types of RISC processors—single cycle and 5-stage pipelined—are explored using an exemplary design space exploration process of the disclosed hardware design tool. RISC processors can have good area, yet limited throughput due to the lack of instruction level parallelism.

In one example, the single cycle RISC processor can have small area, yet the frequency can be lower due to the fact that each instruction executes in one cycle. This can limit the throughput. Nevertheless, such a processor can be useful in many situations. The Xilinx PicoBlaze processor is similar in nature, and can be used for high level control of a larger system and for tasks associated with limited throughput and/or latency. In another example, the 5-stage RISC processor can increase the throughput by reducing the critical path and therefore increasing the clock frequency at the expense of adding additional area. Nevertheless, such a processor design can still be useful in many different applications too. This processor is similar to the Xilinx MicroBlaze, which sees widespread use. However, it does not satisfy the demand for high throughput applications, like radio frequency modems, but can be efficient and effective for lower throughput application like audio processing.

The design space options for RISC processors can involve choosing between the single cycle implementation and the pipelined implementation. This can be a rather simple tradeoff; if a low area solution is desired, then the single cycle architecture can be chosen. For better throughput, the pipelined processor can be chosen. However, better throughput demands can be met by moving to a different class of processor, e.g., the VLIW processor, described later in this disclosure, which can provide significant instruction level parallel-ism. Therefore, in some scenarios, it may not be better to augment the RISC processor with more complex architectural requirements, e.g., more register ports, and additional functional units, but rather to augment the more complex architecture of another class of processor.

The RISC architecture can provide a good solution for low throughput applications. The processor can be simple by nature and therefore efficient in terms of area. The design space exploration options can be rather limited, though significant amount of trimming/elimination of the architecture can be performed to further reduce the area and increase the throughput by eliminating unnecessary functionality on the critical path.

An exemplary implementation of the top-to-bottom process is described for a single-cycle RISC processor. An initial design can be based upon a single cycle MIPS-like processor that includes three parts: the register file, the functional units, and the interconnect. The instruction set architecture can include all of the basic MIPS instructions. The details of the register file (number of registers, bitwidth, number of ports, etc.) and functional units (number and type) can be specified as inputs to the exemplary base simulator. The base simulator can be given a set of assembly instructions along with an architectural description. The base simulator can track statistics on the usage of various components. This can include the number of times a register is read and written, the usage statistics on the functional units, and a description as to which interconnects paths are used. These statistics can include the exact cycle where each activity occurred. The scheduler can act as the processors control module. The scheduler can read instructions from the instruction memory, decode them to create the necessary control signals for the register file, interconnect and functional units. This single cycle processor can act as one starting point for the S&E design tool, which can be favorable for low area, low throughput solutions.

Figure 4:
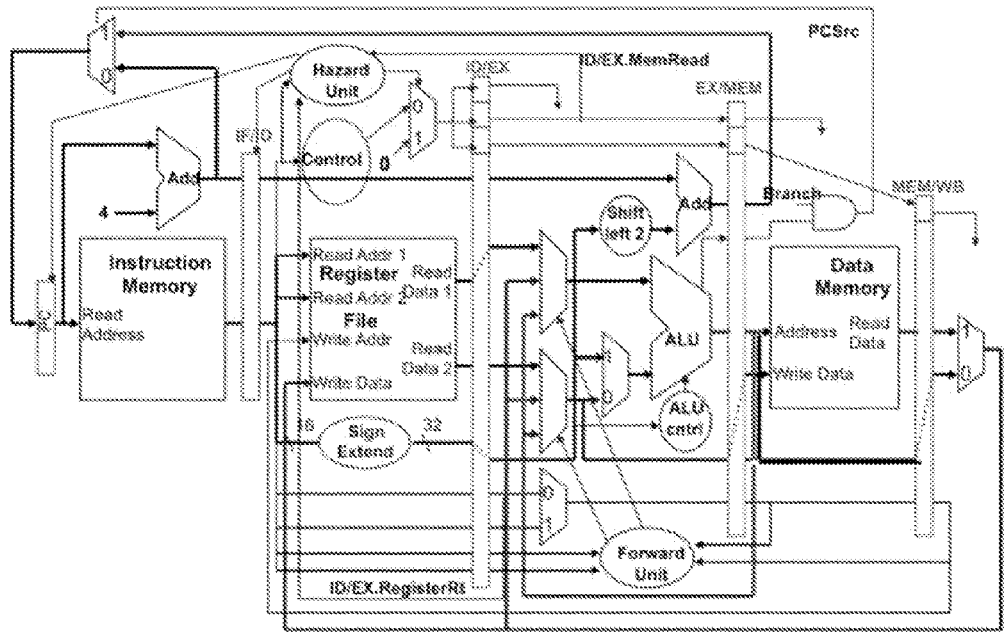
FIG. 4 shows an exemplary RISC architecture where each component in the data path and control is modularized.

An exemplary implementation of the top-to-bottom process is described for a 5-stage pipelined MIPS processor to create a fully functional processor. Caches and more advanced branch predictors can be additional features that greatly enhance performance, which can also be incorporated in this approach. The processor can be built in a highly modularized manner by trimming or eliminating portions of the processor. For example, the processor control can be separated from the data path as shown in FIG. 4 to ease the transition from fully dynamic control to more static or fixed control. FIG. 4 exhibits a pipelined RISC Architecture (e.g., an S&E architecture of a MIPS instruction set architecture (ISA)), where each component in the data path and control is modularized to facilitate the trimming process.

Figure 5:
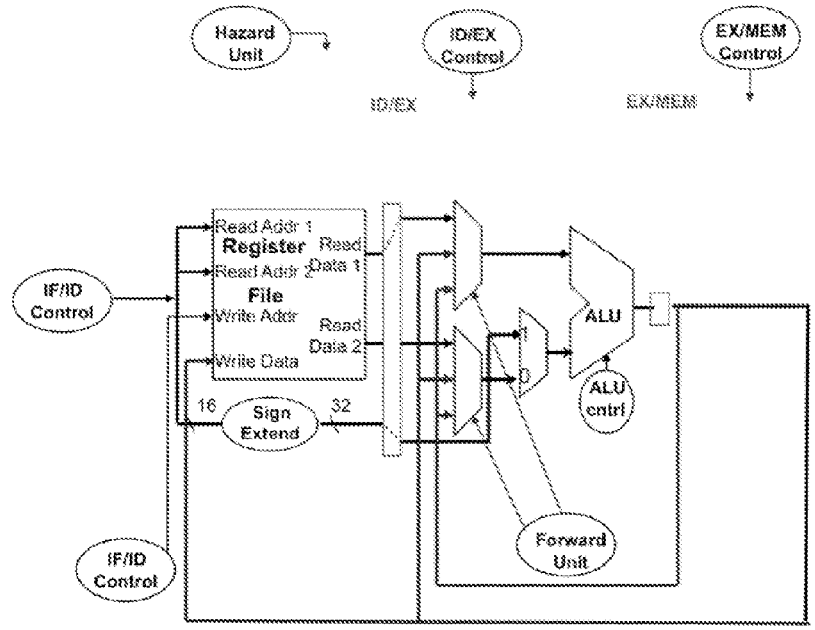
FIG. 5 shows an exemplary RISC architecture after trimming.

The disclosed technology can implement a top-to-bottom methodology for eliminating unnecessary portions of the exemplary 5-stage MIPS processor based upon the given application. For example, a 4×4 matrix multiply can trim the memory controller, logic for control flow instructions, portions of the forwarding and hazard logic, and eliminate the dynamic control for each of the pipeline stages. The exemplary resulting 5-stage MIPS data path is shown in FIG. 5, which has a ~20% reduction in gates and a ~27% reduction in flip-flops (compared to the previous architecture in FIG. 4).

The top-to-bottom approach to processor design can include the follow practices. A data path can be designed essentially as a combinational, stateless block that has its behavior completely dictated by the control. In this way, the portions of the processor that S&E can be configured to replace or eliminate can be known. The processor design can be highly modularized so that it can be effectively developed, tested, and debugged. This modularity not only can apply to the processor as a whole, but to the control and data paths as well. If the control is highly modularized, portions can be incrementally replaced during the elimination phase. Poor modularization can make the control complicated, difficult to understand and hard to remove when the application at hand does not require it. The processor design can begin with a simple design and incrementally add complexity. The main concern can be that of a functional processor; adding new features for performance can make the processor more robust. For example, a fully function pipelined processor can be created first. Then, adding new functionality such as branch prediction and caching can be done subsequently.

VLIW architecture can have a larger number of parameters to optimize. Therefore, the top-to-bottom methodology can incorporate a decision process on the number and type of functional units, the number of registers, and the number of register read/write ports. These parameters are tightly coupled, meaning that changes in one can affect the other. For example, the framework of the disclosed technology can provide a design space exploration using allocation, scheduling and binding algorithms different from other approaches. For each algorithm, the tool can provide the estimated number of registers, number of register read/write ports, functional units and cost of interconnect for particular architecture(s). This can provide a starting point for trimming/elimination. The framework can allow time constrained scheduling (TCS), resource constrained scheduling (RCS), and a combination of RCS and TCS using an exemplary algorithm, e.g. ant colony optimization (ACO) meta-heuristic. This can provide much richer design space exploration in addition to different parameters settings.

Figure 6:
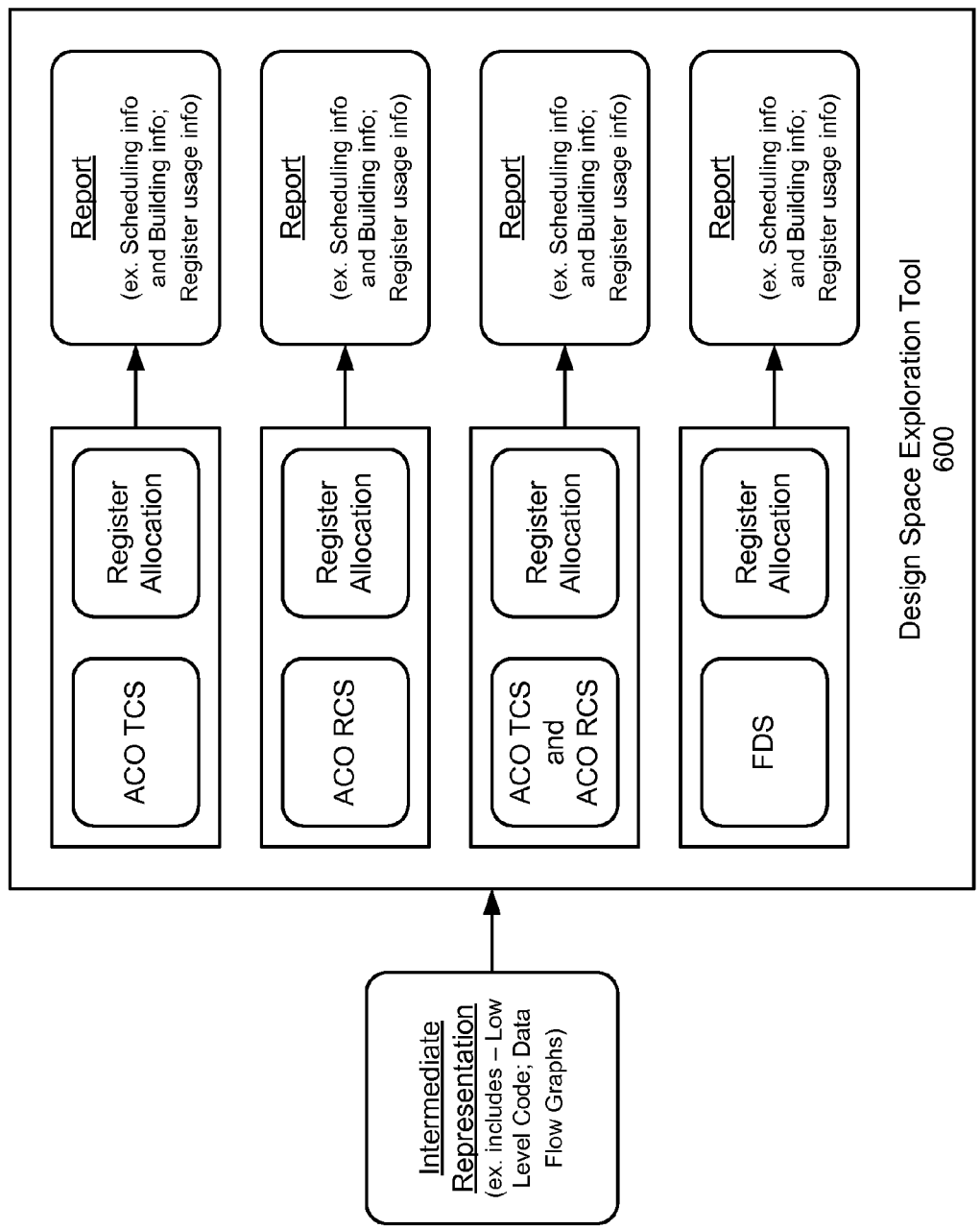
FIG. 6 shows an exemplary design space exploration tool for a VLIW-based processor architecture.

FIG. 6 shows an exemplary design space exploration tool 600 for the VLIW-based processor architecture that utilizes an extensible framework for scheduling, allocation and binding. Several different algorithms can be used to determine the VLIW processor architecture parameters, and others can easily be incorporated. The framework can be built to be flexible and can be extended to include any algorithm for scheduling/ allocation and binding. For example, the framework can employ ACO TCS and ACO RCS and force directed scheduling (FDS) for instruction scheduling, and left edge and graph coloring for register allocation. The exemplary design space exploration can be evaluated using ACO TCS, ACO RCS, and FDS combined with left edge algorithm.

An ACO algorithm is a cooperative heuristic searching algorithm based on the behavior of ants to manage to establish the optimal path between their colony and a food source within a very short period of time. An exemplary ACO algorithm can be applied to the instruction scheduling problem. It can start by releasing n ants over m iterations. In each iteration, each of the n ants can produce a schedule. Each ant can schedule the instructions based upon a local heuristic (a form of list scheduling or FDS) and global pheromone that is based upon the decisions of previous ants. Then a cost function can calculate cost of each schedule, and reinforces the pheromones of the best schedules, making those decisions more likely to be selected in subsequent iterations. As the algorithm progresses, the ants are more likely to select better decisions (e.g., assign an operation to a more favorable control step). This algorithm performs significantly better than FDS and simulated annealing based approaches.

The exemplary ACO approach can be extended by incorporating register allocation. The left edge algorithm can be implemented for register allocation and combined with an exemplary ACO instruction scheduler. The results of the left edge algorithm can be fed back to the ACO scheduler, e.g., augmenting the cost function to include the number of registers. This feedback can be provided when each ant produces a feasible schedule (a.k.a., "ACO with Feedback") or when each iteration (a.k.a., "ACO with Best Case". These principles are illustrated in FIG. 7, exemplifying Instruction scheduling and register allocation with ACO using two different feedback approaches. These two feedback approaches can differ in a sense that one gives feedback after every ant produces a schedule and the other gives a feedback after every iteration.

The exemplary hardware design tool can perform design space exploration with rich set of algorithms that search across a variety of architectural options. The design space exploration can provide a starting point for trimming/elimination to create a hardware accelerator from a general purpose processor. The design space exploration can be performed using ACO TCS, ACO RCS, and FDS for instruction scheduling and functional unit allocation, and left edge algorithm for register allocation. The tool can be extended to include other algorithms and can provide rich set(s) of design space exploration information for different algorithms and parameters. A graph coloring algorithm for register allocation can be implemented, as well as other algorithms, e.g., relational database (RDB).

Returning to the examples of VLIW-based processor design, as noted before, the design space exploration tool can define the architectural parameters, which can include the number of functional units and the type of register file. The architecture generator can create a fully programmable processor based upon these architecture parameters. It is the starting point for the subsequent trimming/elimination phase. A VLIW processor can rely on the compiler (or, using the disclosed technology, it can rely on the design space exploration tool) to perform scheduling and binding of the instructions. Therefore, this can be done statically and is inconsequential to creating the VLIW processor.

The architecture generator can take as input the number of registers, the number of read/write ports, and the number and type of functional units. It can create a fully connected architecture, meaning that every read/write port can access every register. Every register read port can be connected to every input to the functional units, and every write port can be connected to every output of the functional units. This can be defined as a complete interconnect crossbar, which is denoted as having the maximum amount of flexibility.

Once given the requisite architectural parameters, HDL generation can be straightforward. A register file, functional units and control can be created as separate modules. Trimming/eliminating the processor can include moving from fixed control to dynamic control, removing functionality from register ports, and eliminating unneeded connections between functional units and the register ports.

After the design of a final architecture, it can be important to have the ability to recompile a new application onto the existing architecture. This requires a designer to keep some of the functionality of the general-purpose architecture in the final design. Thus, reconfigurability of the final architecture is an important property to consider when exploring the design space of architectures from general-purpose (fully programmable) to application-specific (limited to no programmability).

Flexibility can be an important consideration for hardware accelerators. A fixed accelerator is unable to meet consistently changing market demands. For example, a video standard may change requiring that the codec be updated. Or a newer, more secure cryptography algorithm may appear. An accelerator that can adapt to these changes can be considered more valuable than one that cannot be changed.

Adding flexibility can be inherently opposed to performance and can present a bit of conundrum when attempting to design a flexible hardware accelerator. Yet, an initial, general purpose, fully programmable architecture created using the disclosed technology can be inherently flexible. However, for example, if components are trimmed/eliminated, then the performance of the general purpose architecture can be increased, but it can be likely that its flexibility can decrease. By removing functionality, the architecture may no longer be able to implement future applications that may require this flexibility. Therefore, the disclosed technology can provide a good balance between performance and flexibility.

Figure 8:
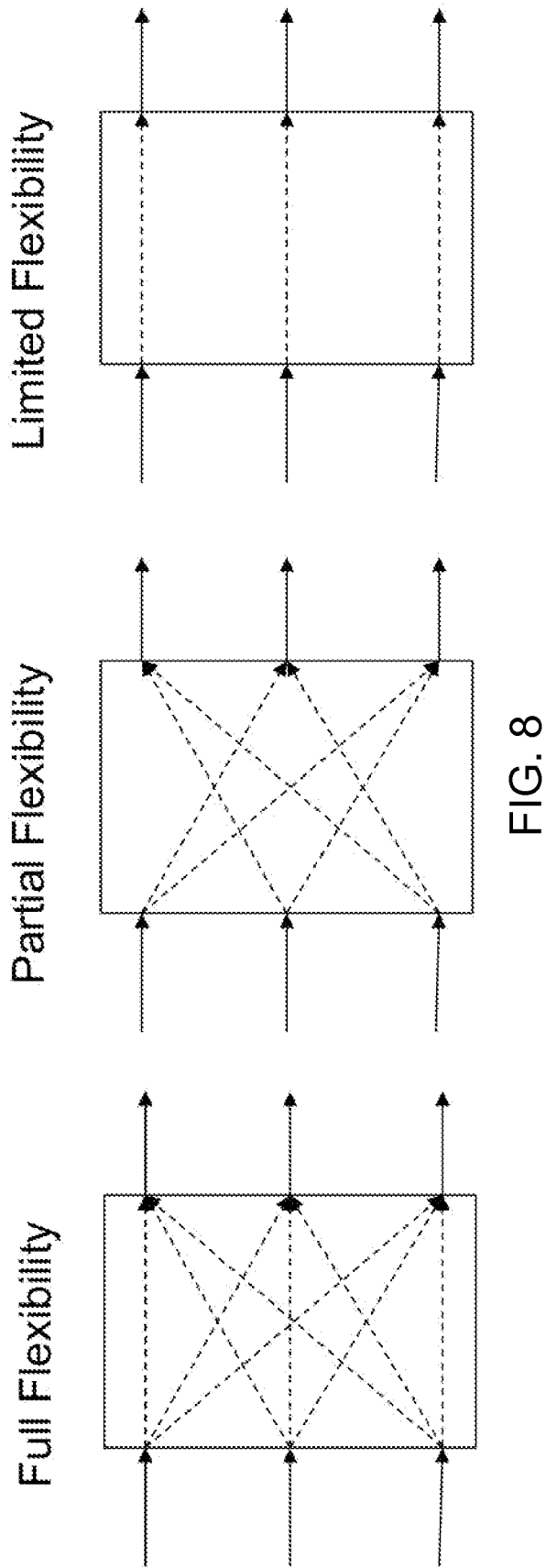
FIG. 8 illustrates three exemplary interconnect matrices showing varying amounts of flexibility.

A flexibility metric can be defined for major processor components: the register file, functional unit and the interconnect. The flexibility of register file and functional unit can be defined by finding ratio of available registers/functional units to required registers and functional units. The interconnect can be a more important and interesting component—particularly, how the current interconnect can satisfy needs of a new application. At the highest level, the flexibility for the interconnect can revolve around the amount of connections between the input and outputs. A flexibility function can be made by defining the ability for any input to reach any output. A full crossbar would allow every input to reach every output. This can be considered as the most flexible interconnect. When trimming/elimination is performed, the ability for some input to reach other outputs can be removed. FIG. 8 illustrates three exemplary interconnect matrices showing varying amounts of flexibility. The flexibility of the interconnect can be described as the ability for an input to reach an output. The left-most featured interconnect is fully flexible as all inputs can be routed to all outputs. The middle and right-most interconnects have more limited degrees of flexibility, from left to right. This flexibility can be quantified in a more precise manner to demonstrate how it actually handles applications that were not originally targeted towards the hardware accelerator.

In another embodiment of the disclosed technology, this specification describes a system that includes a general architecture design utility and synthesis tool for optimization (GUSTO), a hardware design tool that can provide a push-button transition from a high level specification (such as matrix computation algorithms) to hardware description language. An exemplary GUSTO system can employ a top-to-bottom design methodology to generate correct-by-construction and cycle-accurate application specific architectures. For example, GUSTO can divide given matrix computation algorithm(s) into smaller processing elements (PEs) and instantiate PEs with hierarchical data paths in a multicore fashion, which can provide an architecture small in area and highly optimized for throughput. The different design methods and parameterization options that are provided by a GUSTO system can enable a user to study area and performance tradeoffs over a large number of different architectures and find the optimum architecture for the desired objective.

Exemplary benefits of a GUSTO system can include, but is not limited to, (1) rapid development of single-core field-programmable gate array (FPGA) elements, (2) hierarchy data path implementation for multi-core FPGA elements, (3) FPGA engine(s) for MATLAB, (4) domain specificity (e.g., specifically targeting matrix computation algorithms), (5) path(s) to built-in libraries (e.g., including previously implemented matrix computation algorithms to be used while designing larger applications), and (6) end platform independency. An exemplary GUSTO system can include design tool(s) which can allow rapid development of complex matrix computation algorithms with different parameterization options; this can be useful for a wide variety of designs, providing higher performance computing and faster time to market. An exemplary GUSTO system can be capable of dividing the given algorithms into small highly parallelizable PEs, generate hardware and combine these small PEs with hierarchical data paths in a multi-core architecture fashion; this can result in multi-core architecture solutions that are smaller, cheaper, and lower power. An exemplary GUSTO system can enable software engineers to implement hardware out of MATLAB code (without prior knowledge in hardware design); the implemented MATLAB programs can have excellent performance for matrix-heavy computations, including many scientific computational algorithms such as signal processing, computer vision and financial computations. An exemplary GUSTO system can target different platforms, such as GPUs (Graphics Processing Units) and CMPs (chip multiprocessors) with the appropriate changes to the back end of the tool.

An exemplary GUSTO system can include a method that operates in the manner previously shown in FIGS. 1A and 1B. The system can receive an algorithm from a user and allows the user to input parameters, e.g., the type and number of arithmetic resources, the data representation (integer and fractional bit width). Using the parameters, the system can automatically generate optimized application-specific processor architecture or processing elements.

Application specific architectures generated by GUSTO can employ the optimal number of resources which maximizes the throughput while minimizing area. GUSTO also can incorporate hierarchical data paths and heterogeneous architecture generation options. By using these features, a user can divide the given algorithms into small highly parallelizable parts, generate hardware using GUSTO, and combine the small PEs with hierarchical data paths to perform multi-core processing.

In the exemplary architecture generation step, GUSTO can create a general purpose processor architecture or processing elements which exploits instruction level parallelism. GUSTO then can simulate the general purpose PE to collect scheduling information and perform resource trimming to create an optimized application-specific processor architecture or processing elements while ensuring the correctness of the solution is maintained. These optimizations can be thought of as two sections: (1) static architecture generation and (2) trimming for optimization.

Static architecture generation: GUSTO can generate a general purpose processor architecture or processing elements and its data path by using resource constrained list scheduling after the required inputs are given. Simulating this architecture can reveal the assignments done to the arithmetic units and the memory elements during the scheduling process. Gathering this information and using it to cancel the scheduling process and dynamic memory assignments can result in an optimized architecture with significant area and timing savings.

Figure 9:
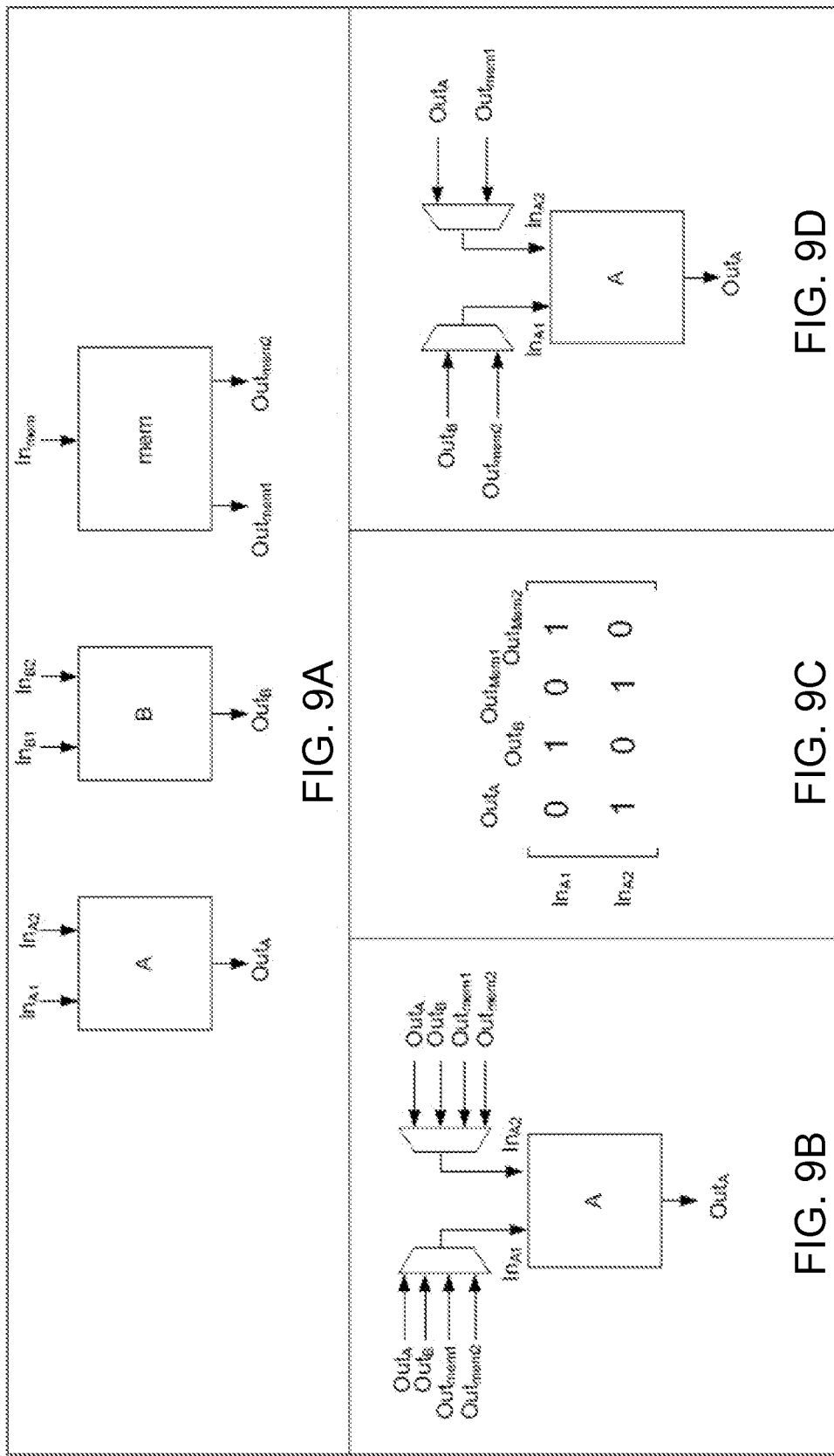
FIGS. 9A, 9B, 9C, and 9D show an example of trimming and optimization.

Trimming and optimization: GUSTO can perform trimming of the unused resources from the general purpose PE while ensuring that correctness of the solution is maintained. GUSTO can simulate the architecture to define the usage of arithmetic units, multiplexers, register entries and input/output ports and trims away the unused components with their interconnects. An example of trimming and optimization is shown in FIG. 9. FIG. 9A supposes there are two arithmetic units (A and B) and one memory; arithmetic units A and B have 2 inputs (e.g., $In_{A1}$, $In_{A2}$ for A; $In_{B1}$, $In_{B2}$ for B) and 1 output (e.g., $Out_A$ for A; $Out_B$ for B); and memory unit has 1 input (e.g., $In_{mem1}$, $In_{mem2}$) and 1 output (e.g., $Out_{mem1}$, $Out_{mem2}$). FIG. 9B shows, for this example, the Input/Output ports relationship between A and A, B, Memory, assuming that every unit is connected to A. Although $Out_A$, $Out_B$, $Out_{mem1}$, and $Out_{mem2}$ are all inputs to $In_{A1}$ and $In_{A2}$, not all the inputs may be used during computation. GUSTO can represent whether an input/output port is used during simulation displaying the results in a matrix, such as the one shown in FIG. 9C. FIG. 9C shows, for this example, this Input/Output ports relationship can be described as a 2×4 matrix. 1s and 0s represent used and non-used interconnects. FIG. 9D shows, for this example, the trimming performed using the optimization matrix. GUSTO can use these matrices to remove the unused resources. In this example, two inputs, $Out_A$, $Out_{mem1}$ to $In_{A1}$ and another two inputs, $Out_B$, $Out_{mem2}$ to $In_{A2}$ are removed. If there is an optimization matrix that is full of 0s, it can mean that the functional resource is never being used in the architecture. Therefore, GUSTO can remove the functional resource and interconnect from the architecture.

Figure 10:
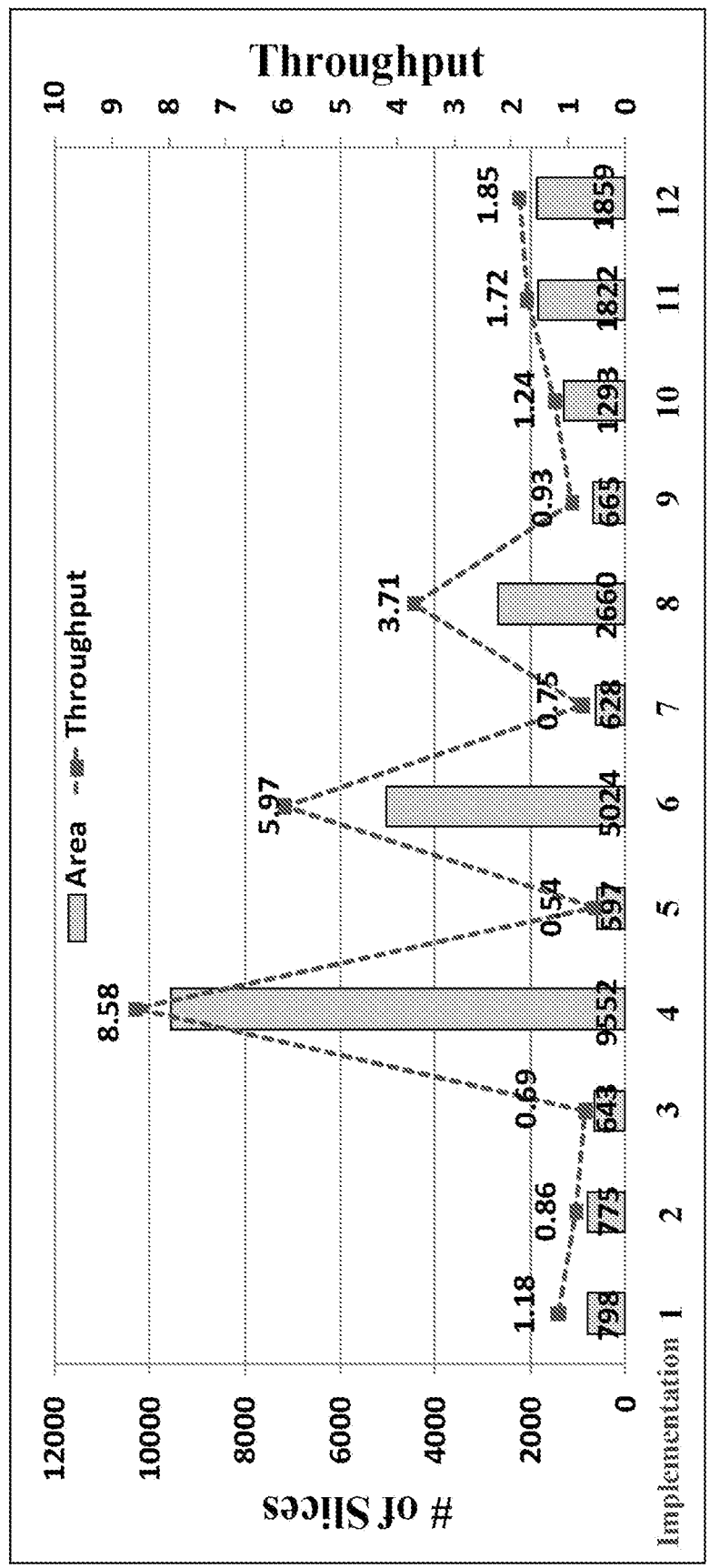
FIG. 10 shows an exemplary tradeoff between computational throughput and area for various matrix multiplication architectures.

The exemplary GUSTO system can provide different design methods and parameterization options which enables a user to study area and performance tradeoffs over a large number of different architectures and pick the most efficient one in terms of the desired objective. FIG. 10 shows an exemplary tradeoff between computational throughput and area for various matrix multiplication architectures. Three different exemplary design methods include: (1) Using one PE for entire matrix multiplication (Implementations 1-3 are the outputs of GUSTO with different number of functional units); (2) Designing a homogeneous architecture by dividing the given computation into identical PEs (Implementations 4-9 are the outputs of GUSTO with different number of PEs); and (3) Designing a heterogeneous architecture with different types of PEs using hierarchical data paths (Implementations 10-12 are heterogeneous architectures that are the outputs of GUSTO with different types of PEs using hierarchical data paths).

The ability to divide a given algorithm into smaller processing elements can result in architectures that are small in area and highly optimized for throughput. These different design methods and parameterization options can enable a user to study area and performance tradeoffs over a large number of different architectures. This can result in more detailed design space exploration and more efficient hardware implementations that enable users to exploit both instruction and task level parallelism.

The disclosed technology can further be exemplified in the following implementations. For example, one embodiment can include the hardware design tool system to be configured for single core design and optimizations. In another embodiment, the hardware design tool system can be configured for multi-core design and optimizations (e.g., that can be specific to multi-core architectures). In another embodiment, the hardware design tool system can be configured to create a design flow specific to image processing that can be implemented using specific image processing applications, which can also be used to evaluate the performance of the design flow and compare them to hand-coded HDL.

In an exemplary initial design flow for a single core design and optimization using the disclosed technology, an exemplary hardware design tool can first receive an algorithm from a user and perform algorithm analysis. Initial design space exploration can be implemented, which can perform instruction selection, determine the required type of arithmetic resources and the data representation for the general-purpose architecture. The exemplary tool can then use this information to generate a fully-connected general-purpose processor architecture.

For example, a RISC type general-purpose processor architecture can be designed that exploits instruction level parallelism using dynamically scheduled out-of-order execution using Tomasulo algorithm. This architecture can be chosen to evaluate the effectiveness of optimizations. The general-purpose processor can include an instruction scheduler, a memory controller and functional resources. The instruction scheduler can read instructions that are pre-generated and placed in its instruction memory. The main duty of the instruction scheduler can be to generate scheduled instructions by assigning operations to the functional resources, e.g., performing scheduling and binding (as illustrated in FIG. 11A). This can be achieved by tracking the availability of the functional resources and the functional units that can produce the operand(s). The instruction scheduler can prevent write after read (WAR) and write after write (WAW) hazards as well as structural hazards. Each functional resource can receive the scheduled instructions and waits for the required operands for its execution. The required operands can be routed through the interconnect matrix, which receives inputs from memory and the functional resources. The functional resources can receive scheduled instructions and waits for the required operands to arrive through the interconnect matrix before beginning execution (as illustrated in FIG. 11B). The memory controller can watch for the data, update its memory entries and prevent read after write (RAW) hazards. The generated architectures can define register files as memory elements that depend on the required number of inputs/outputs for the memory and the required memory size.

The disclosed hardware design tool can perform several optimizations on the general-purpose architecture to create an application-specific processing architecture. The hardware design tool can simulate the general-purpose processing architecture with the given application(s) to collect scheduling and binding information and performs resource trimming to eliminate unnecessary functionality. The end result can be an optimized application-specific processing architecture that maintains correctness of the functionality due to 100% code coverage. These optimizations can be divided into two areas: collecting scheduling information and trimming for optimization. Collecting scheduling information can include the disclosed technology currently using a dynamic resource constrained list scheduling algorithm to schedule and bind operations. Through simulation, it can determine the scheduling and binding information and subsequently use this information to eliminate the dynamic scheduling and dynamic memory assignments, resulting in a static architecture with significant area and throughput savings.

Trimming for hardware optimization can include the disclosed technology paring away all unused interconnect, control, functional resources and memory elements from the general-purpose processing architecture. The architecture can be simulated to define the usage of arithmetic units, multiplexers, register entries and input/output ports, and the disclosed hardware design tool can trim away the unused components along with their interconnect. A detailed example of the trimming method was exemplified in FIGS. 9A-9D.

It is noted that the disclosed technology can guarantee 100% code coverage because of the exploration process of every possible outcome of a conditional statement. As an example, if there is a calculation and the execution of the program depends on that calculation in a format of case statements, all the possible cases can be executed to achieve 100% coverage. Simulations can be performed on the fully-connected general-purpose architecture to determine which interconnect, functional units, memory and control elements are used, and can guarantee 100% code coverage by exploring the every possible outcome of a conditional statement. Because of the 100% code coverage achievement, it can determine the hardware components that were never used, and removing them cannot interfere with the maintenance of the correct functionality of the design.

A single core may not scale well in some exemplary cases since it exploits instruction level parallelism. Task level parallelism can be necessary in order to provide sufficient performance in complex applications. Furthermore, a single processing architecture can limit the design space as it restricts parameterization to only varying the number and types of functional units and associated memory. Therefore, instead of creating one application-specific processing architecture for the entire algorithm, one may choose to generate an application-specific multi-core architecture, which can expand design options and a more efficient final architecture.

In an exemplary initial design flow for a multi-core design and optimization using the disclosed technology, an exemplary hardware design tool can utilize any algorithm(s) and input into analysis process 116 and instruction generation process 117, previously shown in FIG. 1B, e.g., including a partitioning algorithm. In an example of inter-core communications for multi-core architectures, the disclosed hardware design tool can start with general-purpose multi-core architecture utilizing a model of computation that allows all-to-all communication. The exemplary initial multi-core architecture can be fully-connected between cores and employ a shared memory structure. Each core can have two sections of the memory, which can be defined as local and shared variables (as shown in FIG. 12A for an exemplary multi-core architecture employing four processing cores). Local variables can be specific to a core; shared variables can be data communicated between cores. The hardware design tool can partition the shared memory of each processing core in such a way that the memory accesses between cores can be reduced while the overall multi-core architecture can be still fully-connected. There can be two different types of connectivity in this exemplary multi-core architecture: 1) connections from the instruction scheduler of one core to another core's local memory, so that instructions on one core can access shared variables on another core, 2) connections from each shared memory to every functional resource, e.g., there is full connectivity between each shared memory and every functional resource in all of the cores. However, full connectivity might not be required in application-specific architectures. Therefore if there is no data dependency between two cores, hardware design tool can remove the unused interconnect resulting in a platform that has only the necessary connectivity between processing cores (as exemplified in FIG. 12B). FIG. 12A shows an exemplary initial, general-purpose multi-core architecture that provides full connectivity between cores using shared memory. FIG. 12B shows the final application-specific multi-core architecture that can employ separate memories with only the necessary connections between processing cores; GPP and APP correspond to general-purpose and application-specific processing cores, respectively.

In another embodiment, the hardware design tool system can be configured to create a design flow specific to image processing that can be implemented using specific image processing applications. For example, real-time image processing can be necessary in a multitude of applications, such as monitoring and surveillance, human computer interaction, smart rooms, autonomous vehicles and medical image analysis. These applications can demand substantial processing power to provide quick decisions based on events in a sequence of images. However, processing images in real-time is far from trivial due to the considerable computational power that can be required to manage high throughput requirements demanded by these applications. Enabling an algorithm to run in real-time can involve intricate knowledge of both the application and the target architecture. Unfortunately, there are few to no designers that deeply understand both image processing algorithms and hardware, leaving application developers with significant challenges to take advantage of the parallelism afforded by the underlying hardware, and leaving hardware designers overwhelmed by the complexity of vision algorithm. In an exemplary initial design flow for an image processing application, the disclosed hardware design tool can be implemented to create libraries for widely used image processing building blocks such as image buffer, line buffer, window buffer, dynamic thresholding, edge detection and histogram equalization. For example, a number of real-time vision applications can include object detection, object tracking, and color classification utilizing hand coded HDL.

Figure 13:
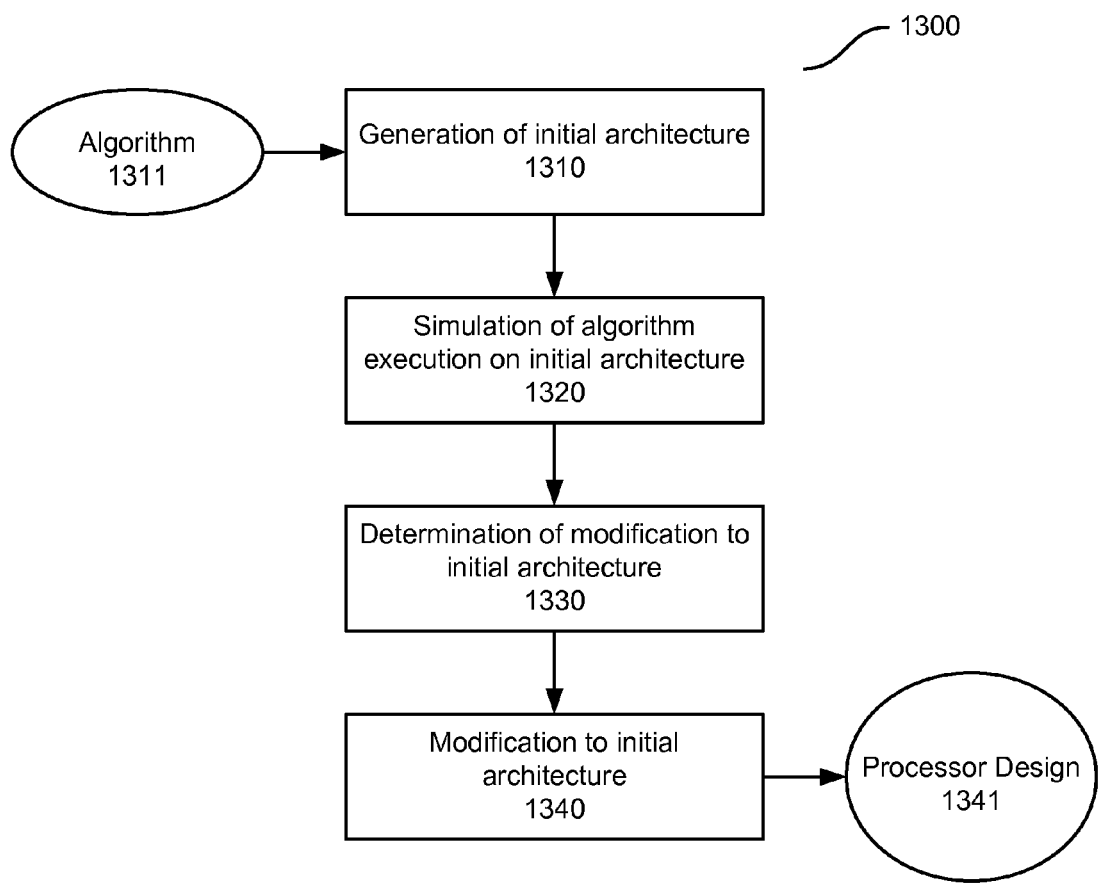
FIG. 13 shows an exemplary method for designing a processor.

FIG. 13 shows an exemplary method 1300 for designing a processor. Method 1300 can include generation of initial architecture method 1310 that can execute an algorithm or multiple algorithms 1311, in which the initial architecture includes processing element(s), memory element(s), and information transfer mechanism(s). The algorithm 1311 can include programs, algorithms, and applications specified by a user, for example high level specification program(s) and algorithm(s) written as program code (e.g., in C, C++, or MATLAB code). Method 1300 also can include simulation of algorithm execution on initial architecture method 1320, which can collect functional information of the processing element(s), memory element(s), and information transfer mechanism(s) and produce a hardware resource usage report. The simulation of the algorithm(s) execution can be performed on one or more computers or one or more processors. The functional information can include utilization characteristics of the processing element(s), memory element(s), and information transfer mechanism(s). Method 1300 also can include determination of modification to initial architecture method 1330, which can determine under-utilized processing element(s), under-utilized memory element(s) and under-utilized information transfer mechanism(s) according to the hardware resource usage report. Method 1300 also can include modification to initial architecture method 1340, which can selectively eliminate under-utilized processing element(s), under-utilized memory element(s) and under-utilized information transfer mechanism(s) according to the hardware resource usage report. A processor design 1341 based on the modification to the initial architecture can be created after implementing modification to initial architecture method 1340.

Implementations of the subject matter and the functional operations described in this specification, such as various modules, can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter affecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Only a few implementations and examples are described and other implementations, enhancements and variations can be made based on what is described and illustrated in this patent document.

What is claimed is:

1. A method for designing a processor, comprising:
generating an initial architecture for a processor to execute at least one algorithm, wherein the initial architecture includes a set of processor components that comprise, at least, a processing element, a memory element and an information transfer mechanism;
simulating execution of the at least one algorithm by the initial architecture to determine a modification to the initial architecture;
creating a processor design based on the modification to the initial architecture; and
determining a flexibility metric for a processor component in the set of processor components to measure a change in functional flexibility due to the modification to the processor component of the initial architecture,
wherein the flexibility metric comprises:
a quantification of the ability for any input to reach any output for information transfer mechanisms in the processor component, and one of:
a ratio of available processing elements to required processing elements for processing elements in the processor component; and
a ratio of available memory elements to required memory elements for memory elements in the processor component,
wherein the functional flexibility of the modified processor component decreases if one or more design elements are eliminated from the processor component of the initial architecture.

2. The method of claim 1, wherein the generating comprises determining a usage pattern of the processing element, the memory element and the information transfer mechanism.

3. The method of claim 1, wherein the generating comprises accepting a high level program code and transforming the high level program code into a low level code.

4. The method of claim 1, wherein the simulating comprises collecting functional information of the processing element, the memory element and the information transfer mechanism and producing a hardware resource usage report, wherein the functional information comprises utilization characteristics of the processing element, the memory element and the information transfer mechanism.

5. The method of claim 4, wherein the creating comprises selectively eliminating at least one of an under-utilized processing element, an under-utilized memory element and an under-utilized information transfer mechanism according to the hardware resource usage report.

6. The method of claim 1, further comprising verifying the processor design.

7. The method of claim 1, further comprising producing a hardware description language of the processor design.

8. The method of claim 1, wherein the effect is a tradeoff to an increase in performance.

9. The method of claim 1, wherein the processor design includes an application-specific architecture that is smaller in area or is higher in throughput or consumes lower power than the initial architecture.

10. The method of claim 1, wherein the initial architecture is fully programmable.

11. An apparatus for designing a processor, comprising:
one or more processors;
a module that generates an initial architecture for a processor to execute at least one algorithm, wherein the initial architecture includes a set of processor components that comprise, at least, a processing element, a memory element and an information transfer mechanism;
a module that determines computational resources for execution of the at least one algorithm on the initial architecture;
a module that creates a processor design based on the computational resources and the initial architecture; and
a module that determines a flexibility metric for a processor component in the set of processor components to measure a change in functional flexibility due to the modification to the processor component of the initial architecture,
wherein the flexibility metric comprises:
a quantification of the ability for any input to reach any output for information transfer mechanisms in the processor component, and one of:
a ratio of available processing elements to required processing elements for processing elements in the processor component; and
a ratio of available memory elements to required memory elements for memory elements in the processor component,
wherein the functional flexibility of the modified processor component decreases if one or more design elements are eliminated from the processor component of the initial architecture.

12. The apparatus of claim 11, wherein the module that generates comprises a module that iteratively determines a usage pattern of the processing element, the memory element and the information transfer mechanism.

13. The apparatus of claim 11, wherein the module that generates comprises a module that accepts a high level program code and transforms the high level program code into a low level code.

14. The apparatus of claim 11, wherein the module that determines computational resources comprises a module that collects functional information of the processing element, the memory element and the information transfer mechanism and produces a hardware resource usage report, wherein the functional information comprises utilization characteristics of the processing element, the memory element and the information transfer mechanism.

15. The apparatus of claim 14, wherein the module that creates comprises a module that selectively eliminates at least one of an under-utilized processing element, an under-utilized memory element and an under-utilized information transfer mechanism according to the hardware resource usage report.

16. The apparatus of claim 11, further comprising at least one of a module that verifies the processor design, and a module that produces a hardware description language of the processor design.

17. A computer program product comprising a non-transitory nonvolatile computer-readable storage medium having instructions stored thereon, the instructions comprising:
code for generating an initial architecture for a processor to execute at least one algorithm, wherein the initial architecture includes a set of processor components that comprise, at least, a processing element, a memory element and an information transfer mechanism;
code for simulating execution of the at least one algorithm by the initial architecture to determine a modification to the initial architecture;
code for creating a processor design based on the modification to the initial architecture; and
code for determining a flexibility metric for a processor component in the set of processor components to measure a change in functional flexibility due to the modification to the processor component of the initial architecture,
wherein the flexibility metric comprises:
a quantification of the ability for any input to reach any output for information transfer mechanisms in the processor component, and one of:
a ratio of available processing elements to required processing elements for processing elements in the processor component; and
a ratio of available memory elements to required memory elements for memory elements in the processor component,
wherein the functional flexibility of the modified processor component decreases if one or more design elements are eliminated from the processor component of the initial architecture.

18. The non-transitory nonvolatile computer-readable storage medium of claim 17, wherein the code for generating an initial architecture for a processor to execute at least one algorithm comprises at least one of code for iteratively determining a usage pattern of the processing element, the memory element and the information transfer mechanism and code for accepting a high level program code and transforming the high level program code into a low level code.

19. The non-transitory nonvolatile computer-readable storage medium of claim 17, wherein the code for simulating execution of the at least one algorithm by the initial architecture to determine a modification to the initial architecture comprises code for collecting functional information of the processing element, the memory element and the information transfer mechanism and producing a hardware resource usage report, wherein the functional information comprises utilization characteristics of the processing element, the memory element and the information transfer mechanism.

20. The non-transitory nonvolatile computer-readable storage medium of claim 19, wherein the code for creating a processor design based on the modification to the initial architecture comprises code for selectively eliminating at least one of an under-utilized processing element, an under-utilized memory element and an under-utilized information transfer mechanism according to the hardware resource usage report.

* * * * *